Feb. 13, 1934.  L. H. IRISH  1,946,624
AXLE MOUNTING
Filed July 1, 1932
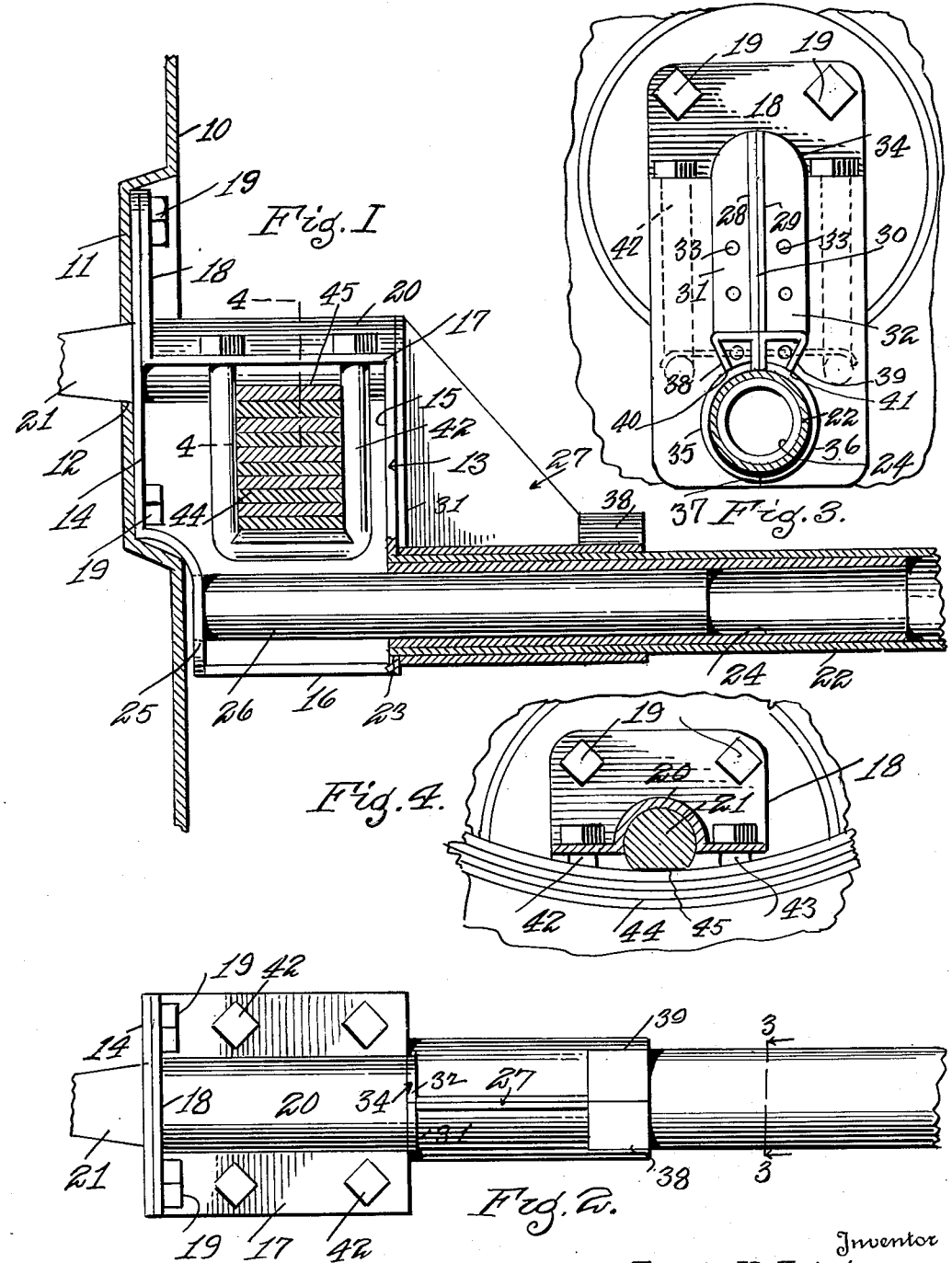
Inventor
Louis H. Irish.
By Felix A. Russell
Attorney Patented Feb. 13, 1934

1,946,624

UNITED STATES PATENT OFFICE 1,946,624

AXLE MOUNTING

Louis Herman Irish, Byers, Tex.

Application July 1, 1932. Serial No. 620,488

1 Claim. (Cl. 301—127)

The present invention relates to a mounting for axles and more particularly to a mounting for a drop axle and hangers for the springs associated therewith.

It is an object of my invention to provide novel means for the mounting of stub axles and novel means for hanging the springs in order that the center of gravity of the vehicle may be substantially lowered.

Other objects and advantages of the invention will be apparent from a reading of the following description in connection with the drawing, wherein for the purpose of illustration, I have shown a preferred embodiment of the invention.

In the drawing:—

Figure 1 is a side elevational view, partly in section of my device,

Figure 2 is a top plan view of the same,

Figure 3 is a sectional view taken on line 3—3 of Fig. 2, and

Figure 4 is a sectional view taken on line 4—4 of Fig. 1.

Referring more particularly to the drawing, I have shown therein a brake housing 10 of conventional design having the usual recess 11 and axle opening 12. My device consists of a boxlike bracket 13 having a front side 14, a rear side 15 and a bottom side 16 and a top side 17 all constructed of one piece of metal. Integral with the top side 17 is an upwardly extending portion 18. Bolts 19 secure the bracket 13 to the recessed portion 11 of the brake housing 10.

An arcuate rib 20 is struck upwardly in the top 17 for the reception of a stub axle shaft 21 which is preferably welded to the under side of the rib 20.

A tubular main axle 22 is secured by welding to the inner edge of an opening 23 in the lower portion of the rear side 15 of the bracket. Sweated within the main axle 22 flush with the inner side of the back portion 15 of the bracket and extending a short distance into the main axle 22 is a tubular brace member 24.

Sweated within the brace 24 and extending therein slightly more than half of the length of the brace and outwardly therefrom in a forward direction to an opening 25 in the lower rearwardly extending portion of the front side 14 of the brace 13 is a stub shaft 26 which is preferably welded to the inner edge of the opening 25.

A substantially triangular shaped web 27 interconnects the rear side 15 of the brace 13 and the main axle 22. This web is composed of a pair of plates 28 and 29 which are welded together as indicated at 30. These plates are bent at right angles to form flanges 31 and 32 which are preferably welded and riveted to the rear side 15 of the bracket 13 by rivets 33 and together form a semicircular top edge 34 which conforms in shape and is welded to the edge of the rib 20.

The lower edges of the plates 28 and 29 are bent around the axle 22 as indicated at 35 and 36 and are welded to the axle 22 and to each other as indicated at 37.

At the lower end of the web 27 the plates 28 and 29 are bent outwardly and downwardly as shown at 38 and 39 and the edges are welded to the axle 22 as shown at 40 and 41 respectively, to form a buffer for the chassis (not shown).

A pair of U-bolts 42 and 43 are secured to the top 17 of the bracket 13 and extend downwardly therefrom within the sides of the bracket and encompass a conventional spring 44.

The axle shaft 21 is provided with a recess 45 at its under side at that portion which lies between the arms of the U-bolts 42 and 43. This is provided for the reception of the top leaf of the spring 44 and is an additional brace for the axle 21.

What is claimed is:

An axle construction consisting of a tubular main axle, a substantially square bracket attached thereto, a sleeve attached to the bracket and mounted within the tubular axle, a reinforcing tubular member affixed within the sleeve and projecting through and permanently fastened to the lower portion of the bracket, a substantially triangular shaped web interconnecting the tubular axle and the bracket, means for fastening the bracket to a conventional brake housing, means for fastening a conventional spring within the bracket and a stub axle permanently affixed to the upper and inner side of the bracket and passing through the bracket and brake housing for the mounting of a wheel.

LOUIS HERMAN IRISH.